(12) United States Patent (10) Patent No.: US 8,914,617 B2
Raikin et al. (45) Date of Patent: Dec. 16, 2014

(54) TRACKING MECHANISM COUPLED TO RETIREMENT IN REORDER BUFFER FOR INDICATING SHARING LOGICAL REGISTERS OF PHYSICAL REGISTER IN RECORD INDEXED BY LOGICAL REGISTER

(75) Inventors: Shlomo Raikin, Geva Carmel (IL);
David J. Sager, Portland, OR (US);
Zeev Sperber, Zichron Yaakuv (IL);
Evgeni Krimer, Eilat (IL); Ori Lempel, Haifa (IL); Stanislav Shwartsman, Haifa (IL); Adi Yoaz, Austin, TX (US);
Omer Golz, Haifa (IL)

(73) Assignee: Intel Corporation, Santa Clara, CA (US)

( * ) Notice: Subject to any disclaimer, the term of this patent is extended or adjusted under 35 U.S.C. 154(b) by 847 days.

(21) Appl. No.: 12/978,513

(22) Filed: Dec. 24, 2010

(65) Prior Publication Data

US 2011/0208918 A1 Aug. 25, 2011

Related U.S. Application Data

(60) Provisional application No. 61/290,200, filed on Dec. 26, 2009.

(51) Int. Cl.
*G06F 9/34* (2006.01)
*G06F 12/08* (2006.01)
*G06F 9/38* (2006.01)

(52) U.S. Cl.
CPC ............ *G06F 12/0862* (2013.01); *G06F 9/384* (2013.01); *G06F 9/3824* (2013.01)
USPC .................. 712/217; 712/E9.034; 712/E9.038

(58) Field of Classification Search
None
See application file for complete search history.

(56) References Cited

U.S. PATENT DOCUMENTS

| | | | |
|---|---|---|---|
| 5,493,669 A | 2/1996 | Denman | |
| 5,644,746 A * | 7/1997 | Holt et al. | 712/217 |
| 5,838,941 A | 11/1998 | Valentine et al. | |
| 5,911,057 A | 6/1999 | Shiell | |
| 6,094,716 A | 7/2000 | Witt | |
| 6,122,656 A | 9/2000 | Witt | |
| 6,141,747 A | 10/2000 | Witt | |
| 6,338,134 B1 | 1/2002 | Leung et al. | |
| 6,405,304 B1 * | 6/2002 | Farrell et al. | 712/216 |
| 6,505,293 B1 * | 1/2003 | Jourdan et al. | 712/217 |
| 6,594,754 B1 | 7/2003 | Jourdan et al. | |
| 6,625,723 B1 | 9/2003 | Jourdan et al. | |
| 6,697,933 B1 | 2/2004 | Pribush et al. | |
| 2009/0228692 A1 | 9/2009 | Barrick et al. | |
| 2012/0005459 A1 * | 1/2012 | Fleischman et al. | 712/216 |

OTHER PUBLICATIONS

Bekeman et al., "Early Load Address Resolution Via Register Tracking," ISCA 2000 Proceedings of the 27th annual international symposium on Computer architecture, Jun. 2000, pp. 306-315.

(Continued)

*Primary Examiner* — Kenneth Kim
(74) *Attorney, Agent, or Firm* — Mnemoglyphics, LLC; Lawrence M. Mennemeier (57) ABSTRACT

Methods and apparatus relating to a hardware move elimination and/or next page prefetching are described. In some embodiments, a logic may provide hardware move eliminations based on stored data. In an embodiment, a next page prefetcher is disclosed. Other embodiments are also described and claimed.

20 Claims, 8 Drawing Sheets

(56) References Cited

OTHER PUBLICATIONS

Sima, "The Design Space of Register Renaming Techniques in Superscalar Processors," Kandó Polytechnic, Institute of Informatics, Budapest, 2000, 46 pages.

Tullsen et al., "Storageless Value Prediction Using Prior Register Values," ISCA '99 Proceedings of the 26th annual international symposium on Computer architecture, May 1999, pp. 270-279.

Yoaz et al., "Speculation Techniques for Improving Load Related Instruction Scheduling," ISCA '99 Proceedings of the 26th annual international symposium on Computer architecture, May 1999, pp. 42-53.

Jourdan et al, "A Novel Renaming Scheme to Exploit Value Temporal Locality Through Physical Register Reuse and Unification," MICRO 31 Proceedings of the 31st annual ACM/IEEE international symposium on Microarchitecture, 1998, pp. 216-225.

* cited by examiner

MIT_SSE

| | 0 | 1 | 2 | 3 |
|---|---|---|---|---|
| XMM0 | 0 | 0 | 0 | 0 |
| XMM1 | 0 | 0 | 0 | 0 |
| XMM2 | 0 | 0 | 0 | 0 |
| XMM3 | 0 | 0 | 0 | 0 |
| XMM4 | 0 | 0 | 0 | 0 |
| XMM5 | 0 | 0 | 0 | 0 |
| ... | | | | |
| XMM12 | 0 | 0 | 0 | 0 |
| XMM13 | 0 | 0 | 0 | 0 |
| XMM14 | 0 | 0 | 0 | 0 |
| XMM15 | 0 | 0 | 0 | 0 |
| free | 1 | 1 | 1 | 1 |

MIT_INT

| | 0 | 1 | 2 | 3 |
|---|---|---|---|---|
| EAX | 0 | 1 | 0 | 0 |
| EBX | 0 | 1 | 0 | 0 |
| ECX | 0 | 0 | 0 | 0 |
| EDX | 0 | 0 | 0 | 0 |
| ESI | 0 | 0 | 0 | 0 |
| EDI | 0 | 0 | 0 | 0 |
| ... | | | | |
| R8 | 0 | 0 | 0 | 0 |
| R9 | 0 | 0 | 0 | 0 |
| ... | | | | |
| R15 | 0 | 0 | 0 | 0 |
| free | 1 | 0 | 1 | 1 |

TRACKING MECHANISM COUPLED TO RETIREMENT IN REORDER BUFFER FOR INDICATING SHARING LOGICAL REGISTERS OF PHYSICAL REGISTER IN RECORD INDEXED BY LOGICAL REGISTER

RELATED APPLICATION

The present application relates to and claims priority from U.S. Provisional Patent Application No. 61/290,200, filed on Dec. 26, 2009, entitled "HARDWARE MOVE ELIMINATION AND NEXT PAGE PREFETCHER" which is hereby incorporated herein by reference in its entirety and for all purposes.

FIELD

The present disclosure generally relates to the field of electronics. More particularly, some embodiments of the invention relate to move elimination and/or next page prefetching.

BACKGROUND

Some processors may speculatively prefetch data to improve performance. Current prefetch solutions may generally stop on the 4 KB page boundary, for example, since it is possible that the next page will have attributes that prevent speculative access to it. Due to this behavior, the performance gain from prefetchers may be limited.

Also, moving data between storage devices may be costly in terms of overhead, latency, and/or power consumption.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof. Also, even though some embodiments discussed herein may refer to a set or clear value as logical 0 and 1, respectively, these terms are interchangeable, e.g., depending on the implementation. Also, the use of "instruction" or "micro-operation" or (which may also be referred to as "uop") herein may be interchangeable.

Some embodiments provide techniques for move elimination and/or next page prefetching. In an embodiment, prefetching may be continued from an adjacent page. In one embodiment, logic may be used to eliminate specific move related instructions from a processor's execution pipeline. Generally, such move operations may be used to save the value that is overwritten by the destination of a normal operation. Eliminating such move operations in turn frees up pipeline resources for other operations, e.g., resulting in higher performance and/or improved power efficiency. Also, as discussed herein, use of a "move" operation or a "copy" operation may be interchangeable.

Figure 1:
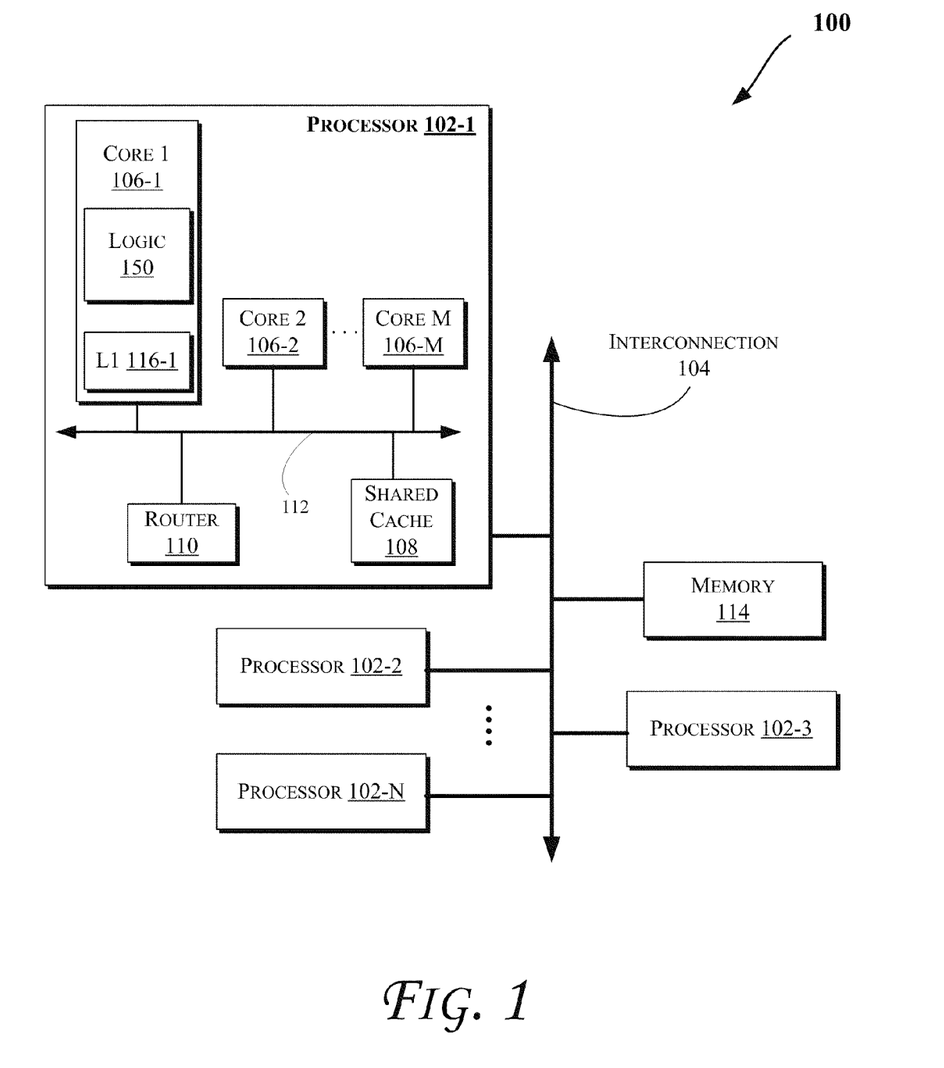
FIGS. 1 and 3-4 illustrate block diagrams of embodiments of computing systems, which may be utilized to implement various embodiments discussed herein.

Techniques described herein may allow for improved performance in various computing devices, such as those discussed for example with reference to FIGS. 1-8. More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection network or bus 104. Each processor may include various components, some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106" or more generally as "core 106"), a shared cache 108, and/or a router 110. The processor cores 106 may be implemented on a single integrated circuit (IC) chip. Moreover, the chip may include one or more shared and/or private caches (such as cache 108), buses or interconnections (such as a bus or interconnection network 112), memory controllers (such as those discussed with reference to FIGS. 3 and 4), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The shared cache 108 may store data (e.g., including instructions) that are utilized by one or more components of the processor 102-1, such as the cores 106. For example, the shared cache 108 may locally cache data stored in a memory 114 for faster access by components of the processor 102. In an embodiment, the cache 108 may include a Mid-Level Cache (MLC) (such as a Level 2 (L2), a Level 3 (L3), a Level 4 (L4), or other levels of cache), a Last Level Cache (LLC), and/or combinations thereof. Moreover, various components of the processor 102-1 may communicate with the shared cache 108 directly, through a bus (e.g., the bus 112), and/or a memory controller or hub. As shown in FIG. 1, in some embodiments, one or more of the cores 106 may include a Level 1 (L1) cache (116-1) (generally referred to herein as "L1 cache 116") and/or an L2 cache (not shown).

Also, processor 102-1 may include a logic 150 to perform operations related to hardware move elimination and/or next page prefetching, as will be further discussed herein below. Also, even though logic 150 is shown to be inside core 106-1, logic 150 may be provided elsewhere in the system in various embodiments. Also, in some embodiments, logic 150 (or any of its components discussed herein) may be shared amongst a plurality of processor cores.

Figure 2:
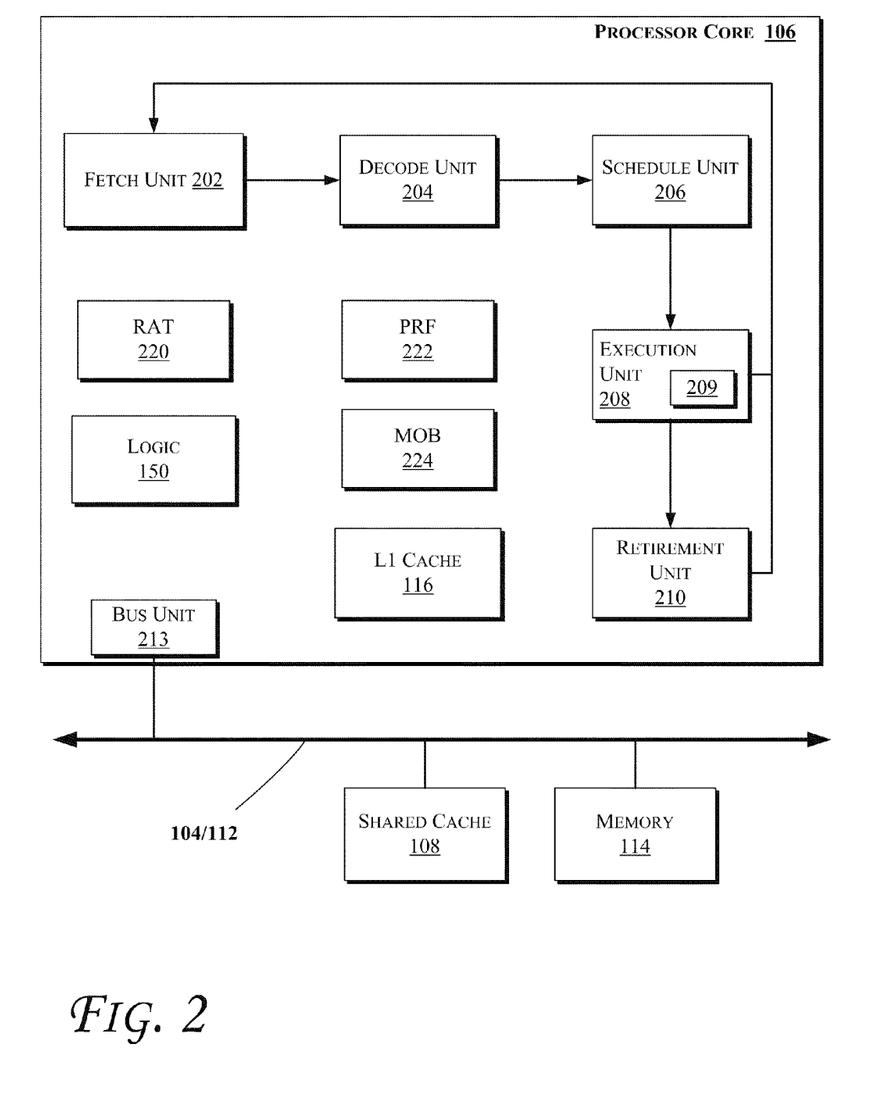
FIG. 2 illustrates a block diagram of portions of a processor core and other components of a computing system, according to an embodiment of the invention.

FIG. 2 illustrates a block diagram of portions of a processor core and other components of a computing system, according to an embodiment of the invention. In an embodiment, at least some of processors discussed herein (e.g., with reference to FIG. 1, 3, or 4) may include one or more of the component of the processor core 106 shown in FIG. 2. Also, a processor may include a single or multi-core 106, which may be homogeneous/symmetric or heterogeneous/asymmetric, etc. such as discussed herein, e.g., with reference to FIG. 1, 3, or 4. In one embodiment, the arrows shown in FIG. 2 illustrate the flow direction of instructions through the core 106. One or more processor cores (such as the processor core 106) may be implemented on a single integrated circuit chip (or die) such as discussed with reference to FIG. 1. Moreover, the chip may include one or more shared and/or private caches (e.g., cache 108 of FIG. 1), interconnections (e.g., interconnections 104 and/or 112 of FIG. 1), memory controllers, or other components.

As illustrated in FIG. 2, the processor core 106 may include a fetch unit 202 to fetch instructions for execution by the core 106. The instructions may be fetched from any storage devices such as the memory 114 and/or the memory devices discussed with reference to FIG. 3 or 4. The core 106 may optionally include a decode unit 204 to decode the fetched instruction. In an embodiment, the decode unit 204 may decode the fetched instruction into a plurality of uops (micro-operations). Some embodiments of the processor core 106 may not include decode unit 204. Hence, the core 106 may process instructions without decoding them. Additionally, the core 106 may include a schedule unit 206. The schedule unit 206 may perform various operations associated with storing decoded instructions (e.g., received from the decode unit 204) until the instructions are ready for dispatch, e.g., until all source values of a decoded instruction become available.

In one embodiment, the schedule unit 206 may schedule and/or issue (or dispatch) decoded instructions to an execution unit 208 for execution. The execution unit 208 may execute the dispatched instructions after they are dispatched (e.g., by the schedule unit 206) and, if applicable, decoded (e.g., by the decode unit 204). In an embodiment, the execution unit 208 may include more than one execution unit, such as one or more memory execution units, one or more integer execution units, one or more floating-point execution units (209), or other execution units. The execution unit 208 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 208.

Further, the execution unit 208 may execute instructions out-of-order. Hence, the processor core 106 may be an out-of-order processor core in one embodiment. The core 106 may also include a retirement unit 210. The retirement unit 210 may retire executed instructions (e.g., in order) after they are committed. In an embodiment, retirement of the executed instructions may result in processor state being committed from the execution of the instructions, physical registers used by the instructions being de-allocated, etc.

The core 106 may further include the logic 150 (such as the logic 150 discussed with respect to any of the previous figures). Additionally, the core 106 may include a bus unit 213 to allow communication between components of the processor core 106 and other components (such as the components discussed with reference to FIG. 1, 3, or 4) via one or more buses (e.g., buses 104 and/or 112). As shown, the core 106 may also include one or more of: a Register Alias Table (RAT) 220, Physical Register File (PRF) 222, a Memory Ordering Buffer (MOB) 224, and a Reorder Buffer (ROB) (not shown, to store information about in flight instructions (or uops), which may be implemented with the PRF 222 in an embodiment).

Figure 3:
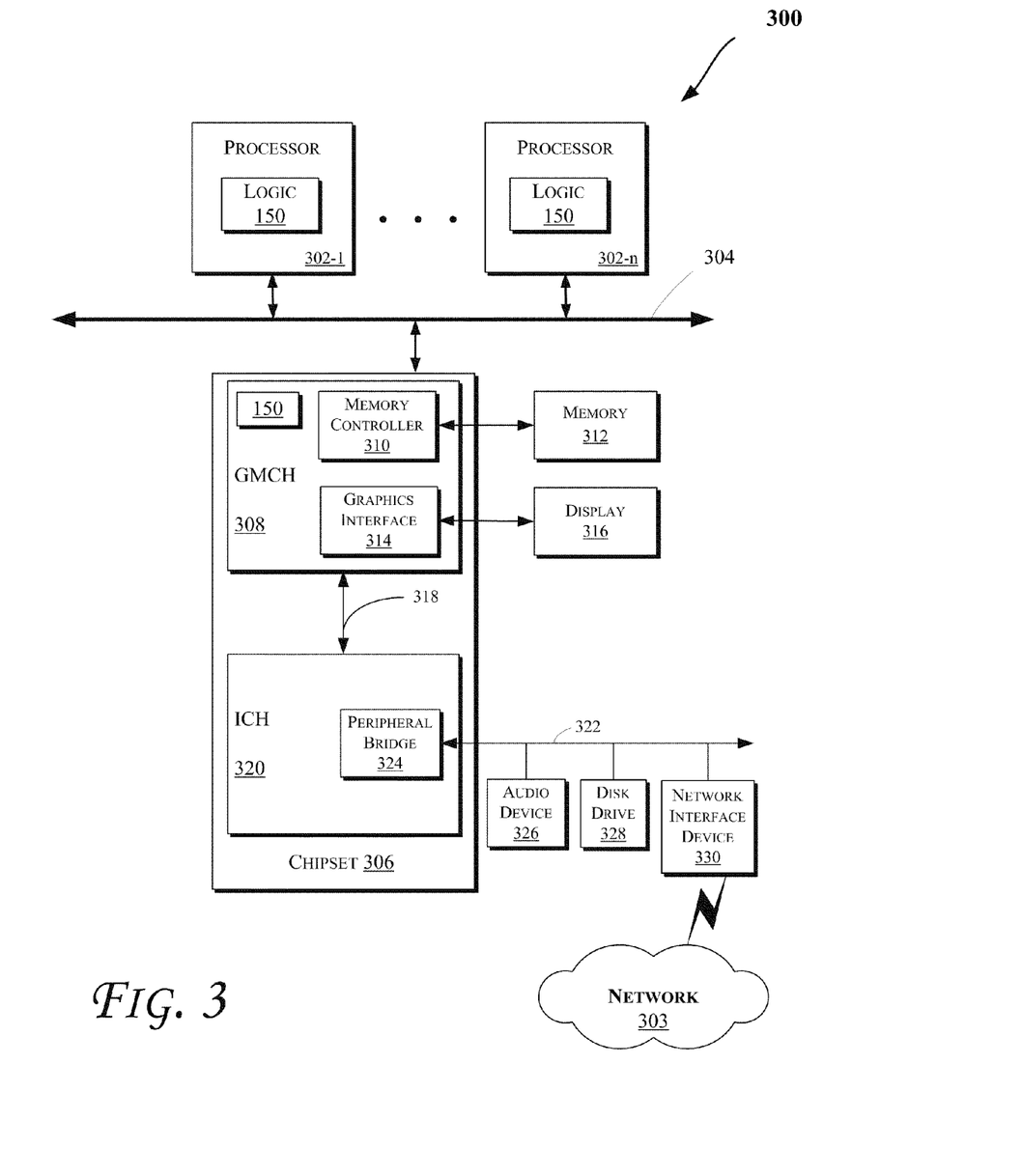

FIG. 3 illustrates a block diagram of a computing system 300 in accordance with an embodiment of the invention. The computing system 300 may include one or more central processing unit(s) (CPUs) 302 or processors that communicate via an interconnection network (or bus) 304. The processors 302 may include a general purpose processor, a network processor (that processes data communicated over a computer network 303), or other types of a processor (including a reduced instruction set computer (RISC) processor or a complex instruction set computer (CISC)). Moreover, the processors 302 may have a single or multiple core design. The processors 302 with a multiple core design may integrate different types of processor cores on the same integrated circuit (IC) die. Also, the processors 302 with a multiple core design may be implemented as symmetrical or asymmetrical multiprocessors. In an embodiment, one or more of the processors 302 may be the same or similar to the processors 102 of FIG. 1. For example, one or more of the processors 302 may include one or more of the caches, storage devices, and/or components of other figures, including for example, logic 150 (however, logic 150 may be provided elsewhere in the components of FIG. 3). Also, the operations discussed herein may be performed by one or more components of the system 300.

A chipset 306 may also communicate with the interconnection network 304. The chipset 306 may include a graphics and memory control hub (GMCH) 308. The GMCH 308 may include a memory controller 310 that communicates with a memory 312 (which may be the same or similar to the memory 114 of FIG. 1). The memory 312 may store data, including sequences of instructions, that may be executed by the CPU 302, or any other device included in the computing system 300. In one embodiment of the invention, the memory 312 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 304, such as multiple CPUs and/or multiple system memories.

The GMCH 308 may also include a graphics interface 314 that communicates with a display device 316. In one embodiment of the invention, the graphics interface 314 may communicate with the display device 316 via an accelerated graphics port (AGP). In an embodiment of the invention, the display 316 (such as a flat panel display) may communicate with the graphics interface 314 through, for example, a signal converter that translates a digital representation of an image stored in a storage device such as video memory or system memory into display signals that are interpreted and displayed by the display 316. The display signals produced by the display device may pass through various control devices before being interpreted by and subsequently displayed on the display 316.

A hub interface 318 may allow the GMCH 308 and an input/output control hub (ICH) 320 to communicate. The ICH 320 may provide an interface to I/O device(s) that communicate with the computing system 300. The ICH 320 may communicate with a bus 322 through a peripheral bridge (or controller) 324, such as a peripheral component interconnect (PCI) bridge, a universal serial bus (USB) controller, or other types of peripheral bridges or controllers. The bridge 324 may provide a data path between the CPU 302 and peripheral devices. Other types of topologies may be utilized. Also, multiple buses may communicate with the ICH 320, e.g., through multiple bridges or controllers. Moreover, other peripherals in communication with the ICH 320 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 322 may communicate with an audio device 326, one or more disk drive(s) 328, and a network interface device 330 (which is in communication with the computer network 303). Other devices may communicate via the bus 322. Also, various components (such as the network interface device 330) may communicate with the GMCH 308 in some embodiments of the invention. In addition, the processor 302 and other components shown in FIG. 3 (including but not limited to the GMCH 308, one or more components of the GMCH 308, IO components, etc.) may be combined to form a single chip. Furthermore, a graphics accelerator may be included within the GMCH 308 in other embodiments of the invention.

Furthermore, the computing system 300 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 328), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 4:
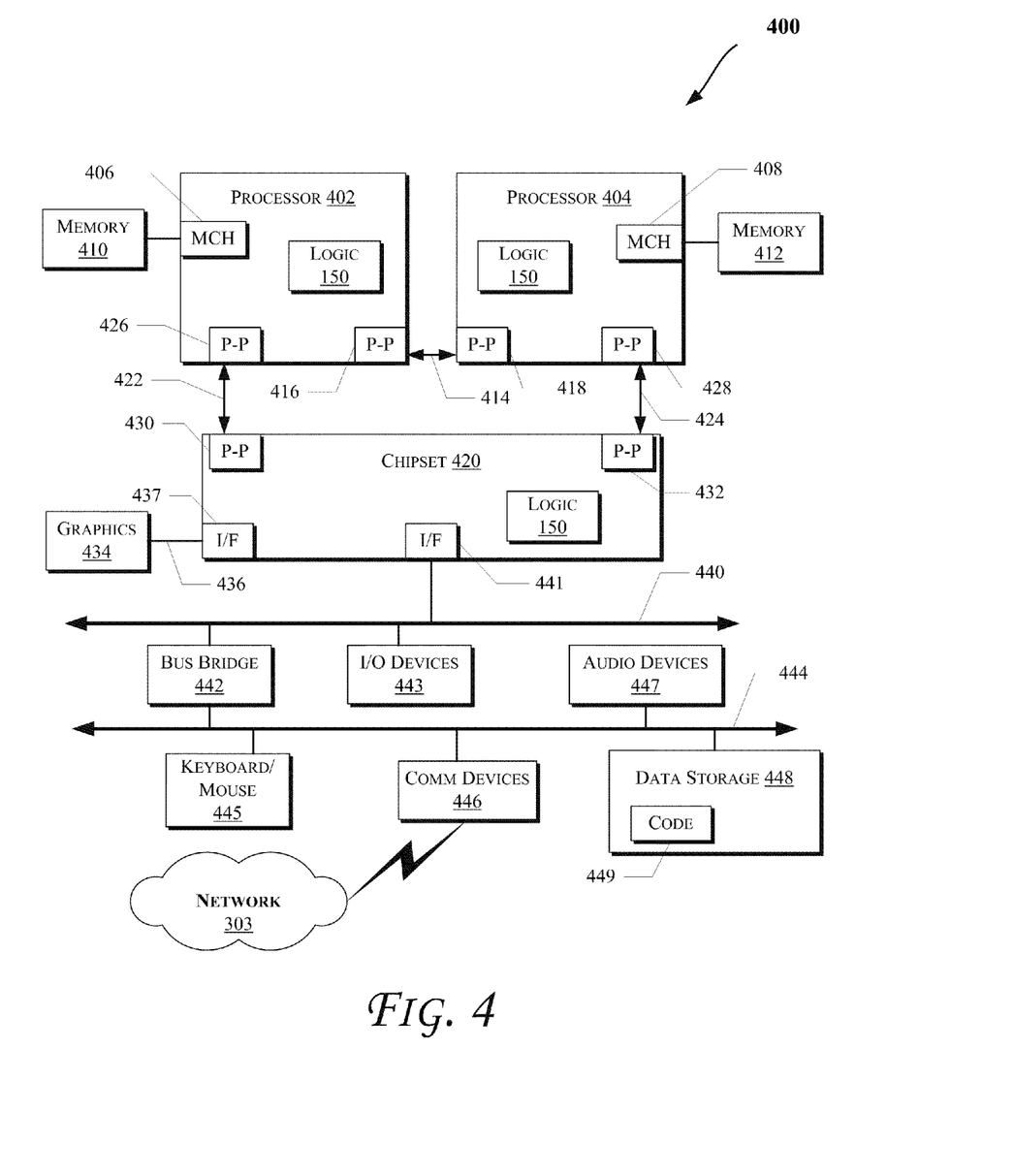

FIG. 4 illustrates a computing system 400 that is arranged in a point-to-point (PtP) configuration, according to an embodiment of the invention. In particular, FIG. 4 shows a system where processors, memory, and input/output devices are interconnected by a number of point-to-point interfaces. The operations discussed herein may be performed by one or more components of the system 400.

As illustrated in FIG. 4, the system 400 may include several processors, of which only two, processors 402 and 404 are shown for clarity. The processors 402 and 404 may each include a local memory controller hub (MCH) 406 and 408 to enable communication with memories 410 and 412. The memories 410 and/or 412 may store various data such as those discussed with reference to the memory 312 of FIG. 3.

In an embodiment, the processors 402 and 404 may be one of the processors 302 discussed with reference to FIG. 3, e.g., including one or more of the caches discussed herein. The processors 402 and 404 may exchange data via a point-to-point (PtP) interface 414 using PtP interface circuits 416 and 418, respectively. Also, the processors 402 and 404 may each exchange data with a chipset 420 via individual PtP interfaces 422 and 424 using point-to-point interface circuits 426, 428, 430, and 432. The chipset 420 may further exchange data with a graphics circuit 434 via a graphics interface 436, e.g., using a PtP interface circuit 437.

At least one embodiment of the invention may be provided within the processors 402 and 404. For example, one or more of the cores 106 of FIG. 1 may be located within the processors 402 and 404. Also, processors 402 and 404 may include one or more of the caches, storage devices, and/or components discussed herein, e.g., logic 150 (however, logic 150 may be provided elsewhere in the components of FIG. 3). Other embodiments of the invention, however, may exist in other circuits, logic units, or devices within the system 400 of FIG. 4. Furthermore, other embodiments of the invention may be distributed throughout several circuits, logic units, or devices illustrated in FIG. 4.

The chipset 420 may communicate with a bus 440 using a PtP interface circuit 441. The bus 440 may communicate with one or more devices, such as a bus bridge 442 and I/O devices 443. Via a bus 444, the bus bridge 442 may communicate with other devices such as a keyboard/mouse 445, communication devices 446 (such as modems, network interface devices, or other communication devices that may communicate with the computer network 303), audio I/O device 447, and/or a data storage device 448. The data storage device 448 may store code 449 that may be executed by the processors 402 and/or 404.

Figure 5:
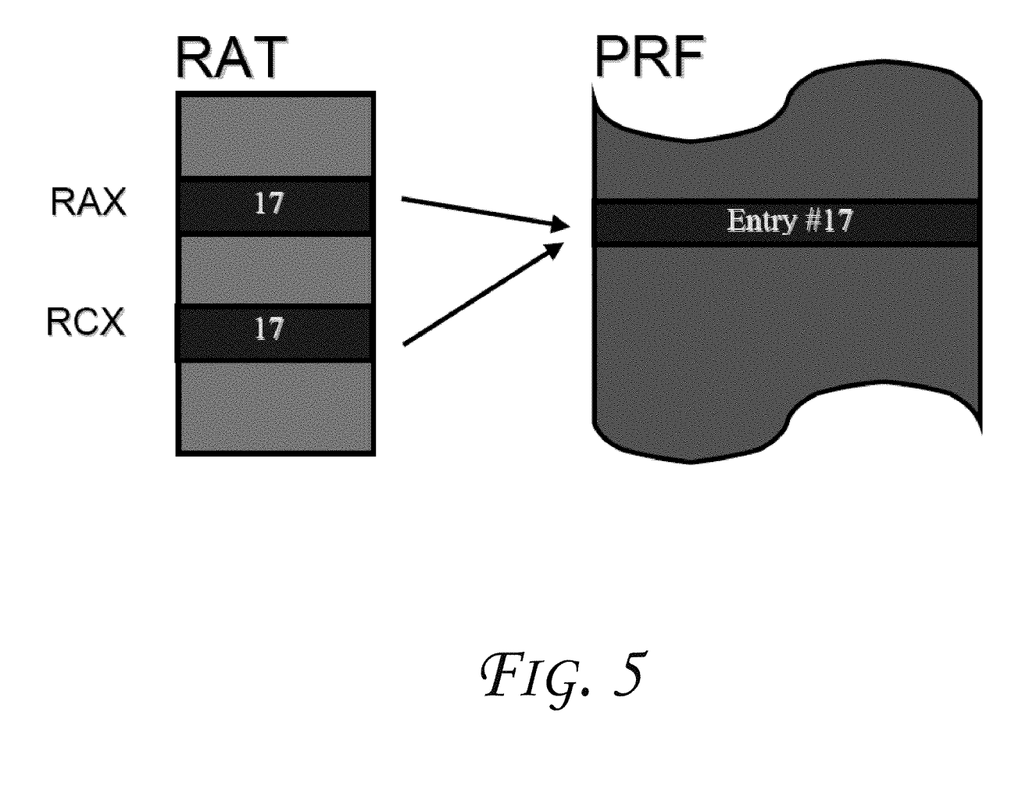
FIG. 5 illustrates a block diagram of two processor registers used to provide Move Elimination (ME), according to an embodiment.

FIG. 5 illustrates a block diagram of two processor registers used to provide Move Elimination (ME), according to an embodiment. More specifically, in some processors a Physical Register File (PRF) may be used to store the speculative state as well as the architectural state. Some other processors may store the speculative data (values produced by uops that have not been retired and therefore they may be incorrect) in a Reorder Buffer entry (a.k.a. ROB entry) allocated by the uop that produced the data and later in the PRF on retirement. This provides a centralized single location for any register that may be read from ROB entry, from the PRF location, or from the bypass into the RS (Reservation Station) entry to be used on dispatch.

By contrast, the former processors may store the data into the PRF that is read by the consumers at dispatch time. This configuration has several advantages compared to techniques that use a ROB with a PRF. For instance, values do not have to be copied when the uop that produced them retires and the RS does not have to store the values consumed by the uop.

A Register Alias Table (RAT) may generally be used to map logical registers (such as those identified by operands of software instructions) to corresponding physical registers. The RAT may hold a pointer to a location that is kept alive from allocation until retirement of the next copy of the register. As a result, an ME may be implemented by making more than one logical register to point to the same PRF entry.

In some embodiments, move operations that map an integer GP (General Purpose) register to another integer GP register or map one XMM register (e.g., referring to a register, where the ISA (Instruction Set Architecture) is called SSE for 128-bits, AVX for 128-bits or 256-bit, and the registers are called XMM for 128-bits or YMM for 256-bit) (or AVX YMM registers (which refer to advanced vector extension registers in accordance with an Instruction Set Architecture (ISA)) to another XMM (or YMM) register are eliminated. In some embodiments, the ME takes into account that writing into 32-bit GP register may clear the upper part and when an operation writes into a XMM in AVX, the upper part is cleared. So, when a MOV is done from a YMM register to XMM register, a bit (e.g., a zero bit) may be set to save the size and the fact that the upper part is cleared—same may be applied for GP 64-bits integer registers in an embodiment, if the zero bit is not used, then the configuration may be generic for X86 ISA such that only same size registers can be eliminated as further discussed below.

In an embodiment, logic (e.g., logic 150) allows multiple pointers to be used in several registers such that a register is deallocated when the next copy of the last occupant register retires. In one embodiment, a transparent duplication of PRF pointers into several renamed registers in the RAT are provided. Such approaches allow for an identification scheme that selects the time when the PRF entry associate with a ME operation may be reclaimed.

As discussed herein, ME generally refers to a feature providing the ability to perform the move operations in the RAT at the stage of allocation (new physical RF entry to the logical destination of a uop) and renaming (converting a logical source of a uop into a physical RF entry), and by doing so avoiding allocation of an entry associate with the move operation into RS, a schedule unit (e.g., schedule unit 206 of FIG. 2—e.g., including dispatch), execution unit (e.g., execution unit 208), and/or a writeback to memory (e.g., to memory 114 of FIG. 2). The move may be performed by sharing a single PRF entry by several architectural registers. The shared PRF entry location may reside in several RAT architectural registers pointers in the RAT renaming array in some embodiments. Therefore, the move operation itself becomes redundant and its execution in the execution cluster is eliminated. And, a physical register is not allocated for an eliminated move operation. A move operation may then be easily removed since it would not have side effects such as changing any of the arithmetic flags.

Referring to FIG. 5, for example, if EAX was pointing to PRF entry 17, and an instruction ECX:=move EAX is encountered, then the move instruction may be implemented by making ECX point to PRF entry 17. This will map the value of ECX to the EAX value and make it be match the value of EAX. In one embodiment, if the uop was ECX:=move.zx AL, then the mapping will be done and a zero bit in the RAT entry will be set to signal that the upper bits (e.g., 56-bits) of the corresponding register is zero or to be ignored. When ECX is later consumed, the lower 8-bits will be consumed from the Physical location 17 and the upper 56-bits will be cleared based on the zero bit set in the RAT. When ECX is ME, the pointer and the zero bit associated with ECX will be copied.

When a pointer is duplicated by the RAT, the uop may not be allocated into the RS and a PRF location for this uop will not be required. The uop still needs to allocate a ROB entry, and would proceed to retirement as other uops. Tracking of the point in time when the last user of that pointer retires and may be reclaimed is provided in an embodiment. More particularly, tracking may be done by using a table called Multiple Instantiation Table (MIT). The MIT may hold a bit indicating which logical register(s) are shared for every shared PRF entry. In some embodiments, four PRF entries may be shared per thread per register type, and one MIT may be maintained for GP integer and MIT is maintained for XMM registers. In an embodiment, when the entry is copied to an additional register, this new register is added to the list of mapped registers. When a register that is shared is renamed it is removed from the list associated with the shared PRF entry. When the shared PRF entry is mapped to a single register or when the last register is renamed, the PRF entry may be marked as a candidate for reclamation.

Figure 6:
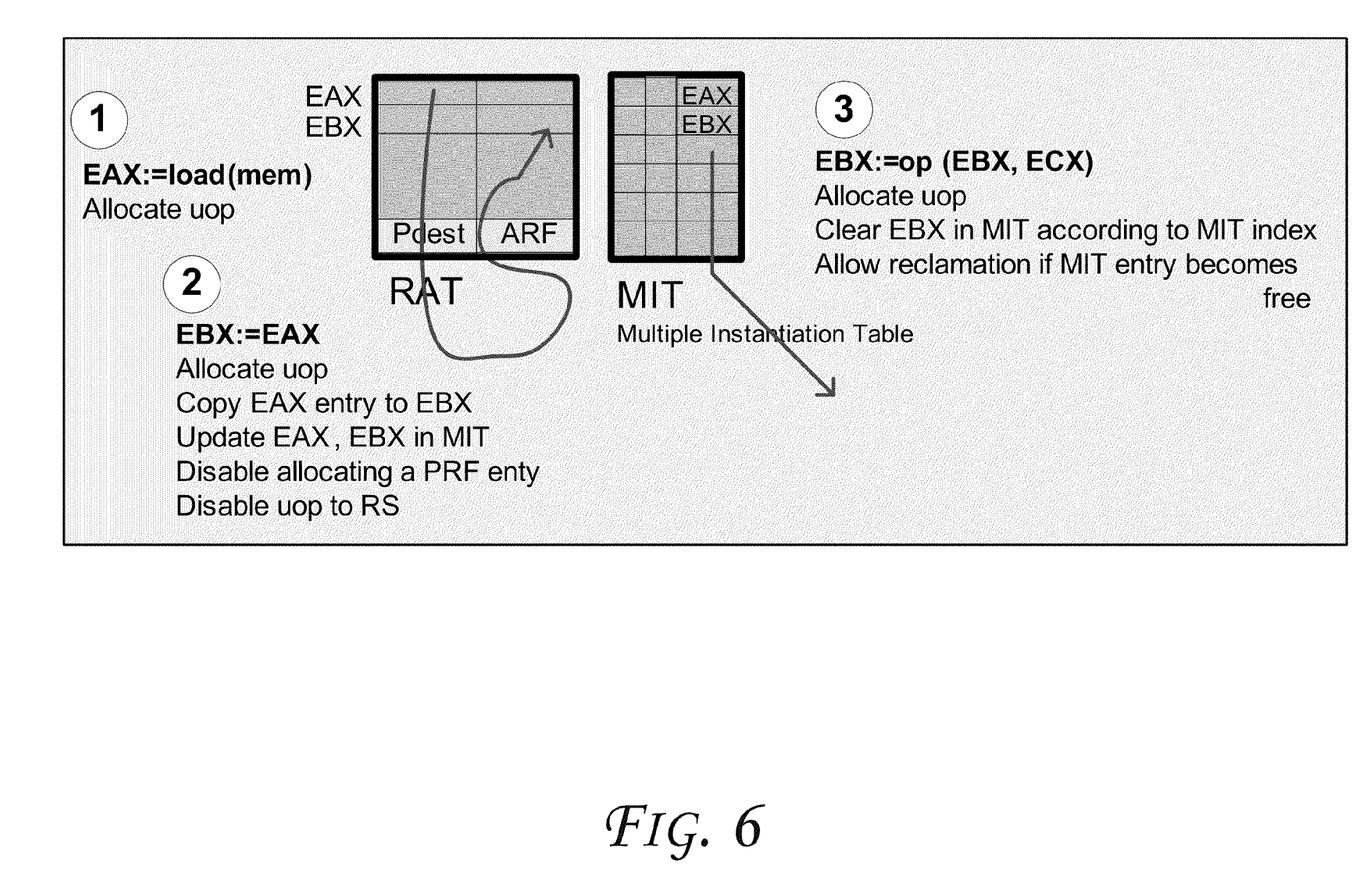
FIG. 6 shows the process of ME using an Multiple Instantiation Table (MIT) structure, according to an embodiment.

FIG. 6 shows the process of ME using a Multiple Instantiation Table (MIT) structure, according to an embodiment. As shown, EAX is allocated in the RAT first. Then, EBX is copied from the EAX. At that point, an MIT column is allocated and it is marked a mapping EAX and EBX to the same PRF entry. The value stored in EAX is copied to EBX such that both registers point to the same PRF entry and are marked to own the same column in the MIT. Then, EBX is renamed and its entry in the MIT is cleared. This may lead to clearing the associating of the MIT entry in EAX and to the reclamation of the EAX value the in next time when it will be renamed.

Figure 7:
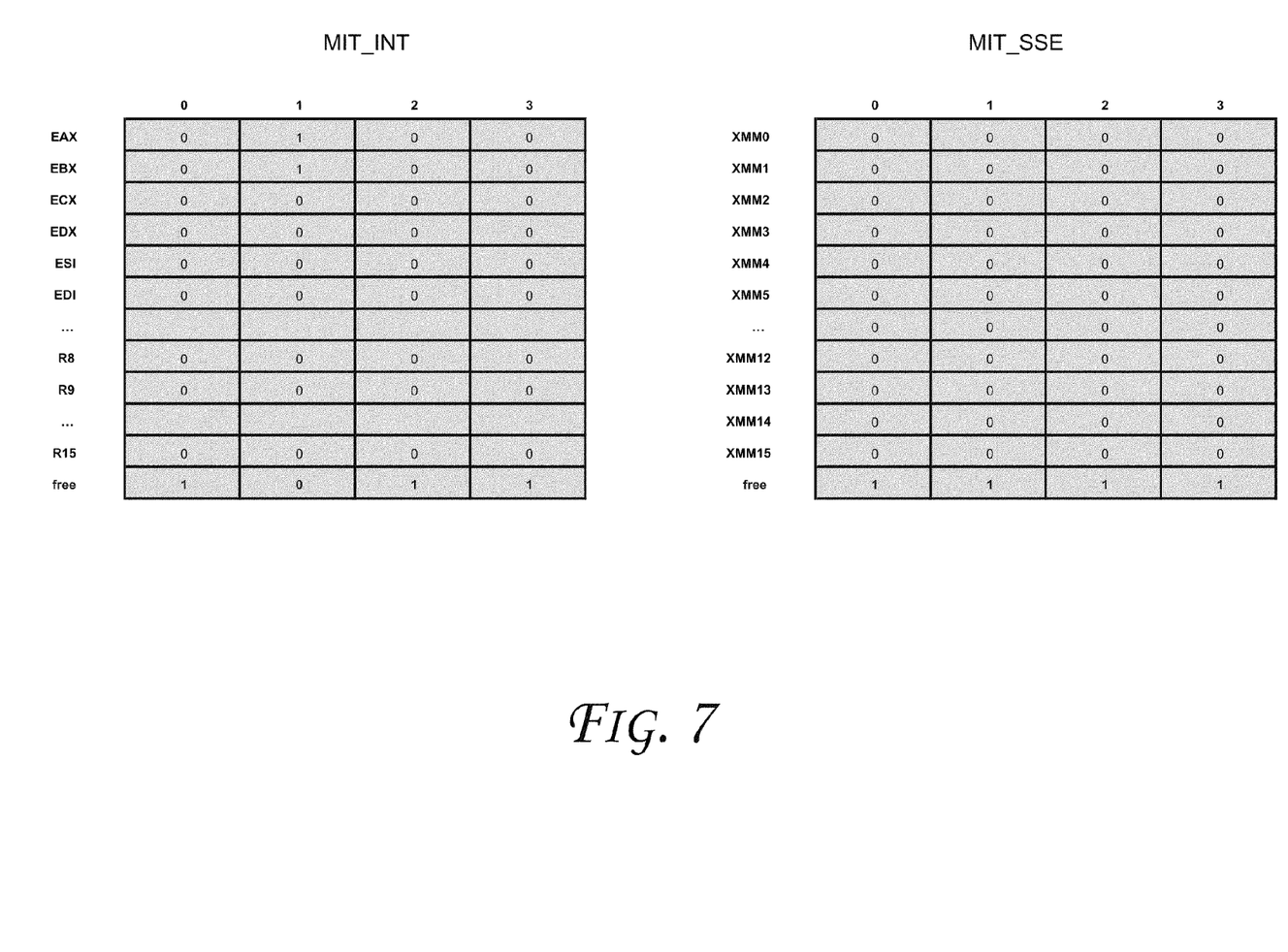
FIG. 7 shows two parts of an MIT, according to an embodiment.

FIG. 7 shows two parts of an MIT, according to an embodiment. As shown, an MIT may consist of two independent parts, MIT_INT and MIT_SSE. The MIT_INT may monitor the moves performed on integer GP register and the MIT_SSE may monitor the moves performed on XMM registers. Each column in the MIT structure (if not free) may be a representation of a PRF entry (on the appropriate stack) that is multiple-pointed. For example, in FIG. 7, in the MIT_INT, column 1 represents that EAX and EBX point to the same PRF entry.

In an embodiment, the following pseudo code may be used for updating the MIT:

```
If (LSRC is GP || LDST is XMM)
{
    If (LDST==LSRC) break; // nothing todo
    If (LDST owns a column) MIT_Remove LDST from its column; //not to reclaim
    If (uop is mov && class(LSRC) match class(LDST) )
    {
        If (LSRC owns a column)
        {
            MIT_Append LSRC column with LDST;
            ELIMINATE!
        }
        else
        {
            If (MIT_Allocate column for LSRC and LDST)
            {
                ELIMINATE!
            }
        }
    }
}
```

Additionally, some embodiments may utilize a plurality of MIT instantiation.

Figure 8:
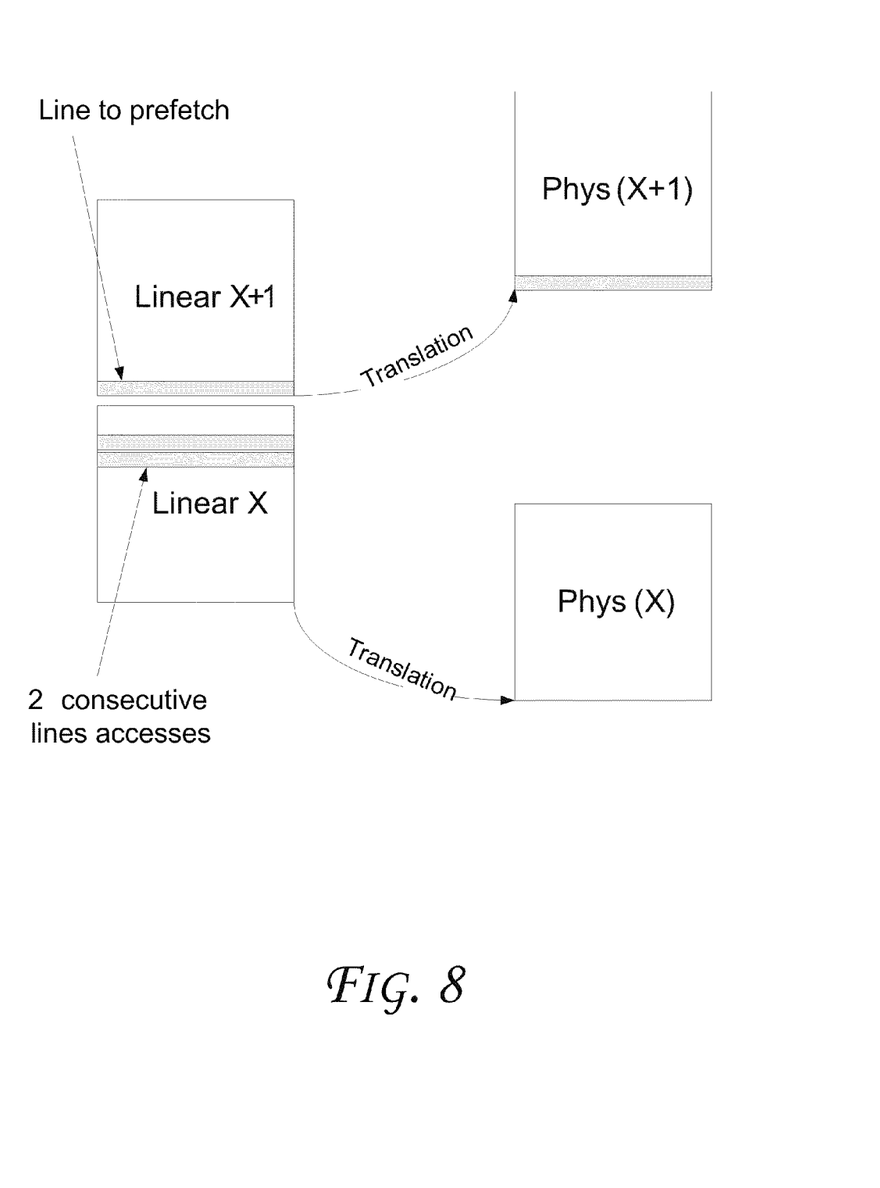
FIG. 8 illustrates a diagram for detecting stride and prefetching the next page, according to an embodiment.

FIG. 8 illustrates a diagram for detecting stride and prefetching the next page, according to an embodiment. In on embodiment, a method to continue prefetching data from another linear page (e.g., past a 4 KB page boundary) is provided. The method may operate in the Memory Ordering Buffer (MOB) 224 of FIG. 2. Generally, the MOB may keep track of memory request(s) in a processor core (e.g., core 106 of FIG. 2) and may reorder some memory requests to improve throughput. A prefetch logic/engine may be located in a processor (such as the core 106 of FIG. 2) to identify program behavior where access to another (e.g., adjacent) linear page is probable, and will prefetch one or more (e.g., the first) lines of the next page. In an embodiment, the prefetch logic may be located in the MOB (e.g., MOB 224 of FIG. 2). Also, shifting prefetch from physical to linear domain may allow for checks not otherwise available in physical domain (such as memory type check, page present check, DTLB check or look up, any other kind of paging-related fault, etc.). In an embodiment, the check(s) may be performed speculatively.

In an embodiment, a detector array (and the techniques using it), as will be further discussed below, detects accesses to the next page. In another embodiment, a prefetch logic (e.g., in the core 106 of FIG. 2) detects a stride, going through page X (such as accesses to every second, third, etc. cache lines), and predicts that this stride will continue in page X+1 or X−1, etc. (or more generally as will be discussed below with reference to UP and DOWN directions).

For example, assuming cache lines of 64B, such that there are 64 cache lines in a 4 KB page, the mechanism (e.g., logic 150) detects accesses to two consecutive cache lines (for example cache lines 51 and 52) in linear page X, and generates a prefetch request to cache line 0 in linear page X+1 (past the 4 KB page boundary). The logic may work in both "UP" direction, detecting probable access to page X+1, and "DOWN" direction, detecting probable access to page X−1.

In an embodiment, the prefetch engine or an detector array may be implemented to detect the consecutive accesses (or strides) in the following way: an array of (e.g., four) detectors may be added and each detector entry may include the following fields: 1. Linear address field (e.g., bits [30:12] to indicate the linear address for detection); 2. Direction field (e.g., 1 bit to indicate up or down direction of the prefetch); and/or 3. Validity field (e.g., 1 bit to indicate validity of the entry). However, all embodiments are not required to have the same number of components mentioned above. Accordingly, in some embodiments, two detected lines may be consecutive or related in accordance with a stride, or both lines may reside in a same tracking window.

As stated above, the prefetch engine/logic may detect accesses to two consecutive cache lines (for example cache lines 51 and 52) in linear page X, and generate a prefetch request to cache line 0 in linear page X+1. In addition, it is possible to generate prefetch request to cache lines 1, 2, etc. In case of "DOWN" accesses, a request to cache line (e.g., 63) may be generated. All examples below are given using the "UP" direction. "DOWN" direction is analogue. On access to cache line 51, a comparison of the load's linear[30:12]+direction ("UP" in this case) will be done with all detectors. In case of hit, LRU (Least Recently Used) entry is updated. In case of miss, a new entry may be chosen according to LRU. The entry may be written with the load's Linear[30:12], "UP" will be set and 'Valid' will be set.

In an embodiment, detector deallocation is done on reset or when a load operation is trying to allocate a new detector request, or an eviction policy (e.g., an older entry may be deallocated according to LRU). On access to cache line 52, a comparison of the load operation's linear[30:12]+direction ("UP" in this case) may be done with all detectors. In case of miss, no further operation will take place. In case of tag hit, but the detector is not 'Valid', update LRU, do nothing further (this is done to prevent repeated prefetch requests to the same address in an embodiment). In case of tag hit and entry 'Valid', LRU is updated and the prefetch request will be added to the memory pipeline of the processor.

After injecting a prefetch request in the memory pipeline by the prefetch logic/engine, a linear-physical translation is to be performed in a DTLB (Data Translation Lookaside Buffer, which may be provided in the processor core of 106 to translate between virtual/logic data/addresses and physical data/addresses). In case of a DTLB miss, a page walk state machine may be invoked to bring in the needed translation. The request may then continue to the cache hierarchy, and may eventually request the data from external memory. Note that in case that the memory type of the next page does not allow speculation, or in case any fault is detected on the new page, the prefetch request may be dropped.

In various embodiments of the invention, the operations discussed herein, e.g., with reference to FIGS. 1-8, may be implemented as hardware (e.g., logic circuitry), software, firmware, or combinations thereof, which may be provided as a computer program product, e.g., including a (e.g., non-transitory) machine-readable or (e.g., non-transitory) computer-readable medium having stored thereon instructions (or software procedures) used to program a computer to perform a process discussed herein. The machine-readable medium may include a storage device such as those discussed herein.

Additionally, such tangible computer-readable media may be downloaded as a computer program product, wherein the program may be transferred from a remote computer (e.g., a server) to a requesting computer (e.g., a client) by way of data signals in a propagation medium via a communication link (e.g., a bus, a modem, or a network connection).

Reference in the specification to "one embodiment," "an embodiment," or "some embodiments" means that a particular feature, structure, or characteristic described in connection with the embodiment(s) may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A processor comprising:
a first storage unit having a plurality of physical registers to store content for a physical register as an entry;
a second storage unit to store one or more pointers, indexed according to one or more logical registers, that map said one or more logical registers to a physical register corresponding to the entry;
a Reorder Buffer (ROB) to store information about an in flight instruction or micro-operation to facilitate retirement of the in flight instruction or micro-operation;
a tracking mechanism operatively coupled with retirements in the ROB to track sharing in time of any entries in the first storage unit, to which more than one of the logical registers map, by a record, indexed according to said more than one of the logical registers, and indicating for every shared entry of the plurality of physical registers which of the logical registers are currently sharing it; and
logic to cause one of the one or more pointers to point to the entry and to update the record indexed by a logical register corresponding to said one of the one or more pointers in response to a request to copy content of the entry to said logical register.

2. The processor of claim 1, wherein the first storage unit is to comprise a physical register file.

3. The processor of claim 1, wherein the second storage unit is to comprise a Register Alias Table (RAT).

4. The processor of claim 1, wherein a plurality of pointers are to point to the entry.

5. The processor of claim 1, wherein the logic is to cause the one of the one or more pointers to point to the entry without allocation of an entry into a reservation station, a schedule unit, an execution unit, or writeback to memory.

6. The processor of claim 1, further comprising a third storage unit is to store a bit to indicate which one of the one or more logical registers are mapped to a shared entry in the first storage unit.

7. The processor of claim 1, further comprising one or more processor cores.

8. The processor of claim 7, wherein at least one of the one or more processor cores are to comprise one or more of the first storage unit, the second storage unit, or the logic to cause the one of the one or more pointers to point to the entry.

9. The processor of claim 6, wherein the third storage unit comprises a Multiple Instantiation Table (MIT) indexed according to said more than one of the logical registers for which each shared entry in the first storage unit is mapped.

10. A system comprising:
a memory to store one or more instructions; and
a processor to execute the one or more instructions, wherein the processor is to comprise at least one processor core comprising:
a first storage unit having a plurality of physical registers to store content for a physical register as an entry;
a second storage unit to store one or more pointers, indexed according to one or more logical registers, that map said one or more logical registers to a physical register corresponding to the entry;
a Reorder Buffer (ROB) to store information about an in flight instruction or micro-operation to facilitate retirement of the in flight instruction or micro-operation;
a tracking mechanism operatively coupled with retirements in the ROB to track sharing in time of any entries in the first storage unit, to which more than one of the logical registers map, by a record, indexed according to said more than one of the logical registers, and indicating for every shared entry of the plurality of physical registers which of the logical registers are currently sharing it; and
logic to cause one of the one or more pointers to point to the entry and to update the record indexed by a logical register corresponding to said one of the one or more pointers in response to a request to copy content of the entry to said logical register.

11. The system of claim 10, wherein the first storage unit is to comprise a physical register file.

12. The system of claim 10, wherein the second storage unit is to comprise a Register Alias Table (RAT).

13. The system of claim 10, wherein a plurality of pointers are to point to the entry.

14. The system of claim 10, wherein the logic is to cause the one of the one or more pointers to point to the entry without allocation of an entry into a reservation station, a schedule unit, an execution unit, or writeback to memory.

15. The system of claim 10, further comprising a third storage unit is to store a bit to indicate which one of the one or more logical registers are mapped to a shared entry in the first storage unit.

16. The system of claim 15, wherein the third storage unit comprises a Multiple Instantiation Table (MIT) indexed according to said more than one of the logical registers for which each shared entry in the first storage unit is mapped.

17. A method comprising:
storing content for a physical register as an entry in a first storage unit having a plurality of physical registers;
storing in a second storage unit, one or more pointers indexed according to one or more logical registers to map said one or more logical registers to a physical register corresponding to the entry;
storing information in a Reorder Buffer (ROB) about an in flight instruction or micro-operation to facilitate retirement of the in flight instruction or micro-operation;
tracking in time, in a mechanism operatively coupled with retirements in the ROB, sharing of any entries in the first storage unit, to which more than one of the logical registers map, by a record, indexed according to said more than one of the logical registers, and indicating for every shared entry of the plurality of physical registers which of the logical registers are currently sharing it; and
causing one of the one or more pointers to point to the entry and to update the record indexed by a logical register corresponding to said one of the one or more pointers in response to a request to copy content of the entry to said logical register.

18. The method of claim 17, further comprising:
storing in a third storage unit, a bit to indicate which one of the one or more logical registers are mapped to a shared entry in the first storage unit.

19. The method of claim 18, wherein the third storage unit comprises a Multiple Instantiation Table (MIT) indexed according to said more than one of the logical registers for which each shared entry in the first storage unit is mapped.

20. The method of claim 18, wherein the second storage unit comprises a Register Alias Table (RAT) for storing said one or more pointers to map said one or more logical registers to the physical register, and for storing one or more zero bits corresponding to each of said one or more logical registers to signal that upper bits of the corresponding logical register are to be zeroed or ignored.

* * * * *